United States Patent

Pawlish et al.

[11] Patent Number: 5,276,916
[45] Date of Patent: Jan. 4, 1994

[54] COMMUNICATION DEVICE HAVING A SPEAKER AND MICROPHONE

[75] Inventors: Joy N. Pawlish, Lake Zurich; Suzanne Y. Cohodes, Arlington Heights, both of Ill.

[73] Assignee: Motorola, Inc., Schaumburg, Ill.

[21] Appl. No.: 772,989

[22] Filed: Oct. 8, 1991

[51] Int. Cl.⁵ .............................................. H04B 1/38
[52] U.S. Cl. ........................................ 455/89; 455/90; 455/349; 455/351; 455/350; 379/420; 379/432; 379/433; 361/814
[58] Field of Search ................. 455/89, 90, 128, 344, 455/347, 348, 349, 350, 351, 74; 379/420, 432, 433, 61; 361/422, 340

[56] References Cited

U.S. PATENT DOCUMENTS

| | | | |
|---|---|---|---|
| D. 135,540 | 4/1943 | Mitchell . | |
| D. 300,742 | 4/1989 | Soren et al. | D14/148 |
| 2,952,739 | 9/1960 | Lehman | 379/420 |
| 3,426,160 | 2/1969 | Ring | 379/432 |
| 3,551,607 | 12/1970 | Tommasi et al. | 179/100 |
| 3,611,140 | 10/1971 | Shimada | 455/89 |
| 3,659,050 | 4/1972 | Carlsson et al. | 379/420 |
| 3,800,089 | 3/1974 | Reddick | 379/432 |
| 4,018,998 | 4/1977 | Wegner | 179/103 |
| 4,178,488 | 12/1979 | Nishihata | 379/420 |
| 4,495,652 | 1/1985 | Leslie | 455/234 |
| 4,647,722 | 3/1987 | Nishida et al. | 455/89 |
| 4,845,738 | 7/1989 | Takano | 455/90 |
| 4,845,772 | 7/1989 | Metroka et al. | 379/61 |
| 4,882,745 | 11/1989 | Silver | 379/61 |
| 4,897,873 | 1/1990 | Beutler et al. | 379/433 |
| 4,912,602 | 3/1990 | Zurek et al. | 455/90 |

FOREIGN PATENT DOCUMENTS 221563 9/1989 United Kingdom ................ 379/432

Primary Examiner—Reinhard J. Eisenzopf
Assistant Examiner—Timothy H. Keough
Attorney, Agent, or Firm—Lesley Ann Rhyne; Daniel K. Nichols

[57] ABSTRACT

A radio or speaker-microphone unit includes a housing having first and second portions. A speaker is disposed in one of the portions and a microphone in the other of the portions. The portions are movable between first and second relative positions, with one of the positions providing a handset configuration and the other providing a speaker-microphone configuration. A switch senses the relative position of the housing portions and adjusts the gain of an audio amplifier.

12 Claims, 4 Drawing Sheets

COMMUNICATION DEVICE HAVING A SPEAKER AND MICROPHONE

TECHNICAL FIELD

This invention relates to communication devices in general and particularly to a communication device, including a speaker and a microphone.

BACKGROUND

Various communication devices utilize both a speaker and a microphone. The conventional telephone type "handset," which is used both for wire-line telephone communication and two-way radio communication, includes a housing having a speaker at one end and a microphone at the other. The speaker and microphone are positioned so that the handset can be held with the speaker adjacent to the user's ear and the microphone in proximity to the user's mouth. Such handsets are used both for full duplex communication, such as a telephone where audio can be produced at the speaker at the same time the user is articulating sound into the microphone. This is conventional in both land line telephone systems and some two-way radio systems. Such a handset can also be used in what is known as half-duplex radio communication, in which voice signals are alternatively transmitted or received. When used in such a configuration, either a push-to-talk switch (PTT) is provided or else a voice-actuated transmit circuit (VOX) can be utilized. Portable, two-way radio transceivers, such as those used in the land mobile radio service, typically include both a microphone and speaker in the housing. While early two-way radio transceivers had the speaker and the microphone configured to permit their use in a manner similar to a telephone handset, most two-way radio transceivers today have the speaker and microphone in relatively close proximity since these devices are typically half duplex and are not capable of simultaneous transmission and reception of signals. This arrangement will be referred to as the speaker-microphone configuration.

Speaker-microphones are devices typically used with radios such as portable or mobile radios, to enable the user to hold the microphone unit, which is connected by a cable to the radio. When used in conjunction with a portable two-way radio, this permits the radio to remain as, for example, clipped to the user's belt, while providing both the audio output and the microphone audio input to the remote unit which the user can position as desired.

Small, foldable radio telephones units, such as the MICROTACO® cellular telephone manufactured by Motorola, Inc., and radios for use in the new CT-2 time division duplex radio system are foldable to provide a compact housing. When the user desires to place or receive a telephone call, the unit is unfolded to permit its use as a handset with the speaker and microphone disposed in positions relatively close to the user's ear and mouth respectively. All these known devices are relatively inflexible in that their use is essentially limited to the predetermined configuration either as a telephone-type handset or as a speaker-microphone configuration.

SUMMARY OF THE INVENTION

This communication device is utilizable with in different configurations. The device includes a housing having first and second portions. The portions are selectively configurable, in first and second relative positions. A speaker is disposed in one of the portions while a microphone is disposed in the other portion. In one aspect of the invention, the portions are hingedly interconnected to permit relative movement between the first and second positions. In another aspect of the invention, the communication device includes a sensor for determining whether the housing portions are in the first or second relative positions. In still another aspect of the invention the device includes an amplifier providing audio signals to the speaker. A control means responsive to the sensor controls the gain of the amplifier.

DETAILED DESCRIPTION OF THE PREFERRED EMBODIMENTS

Figure 1:
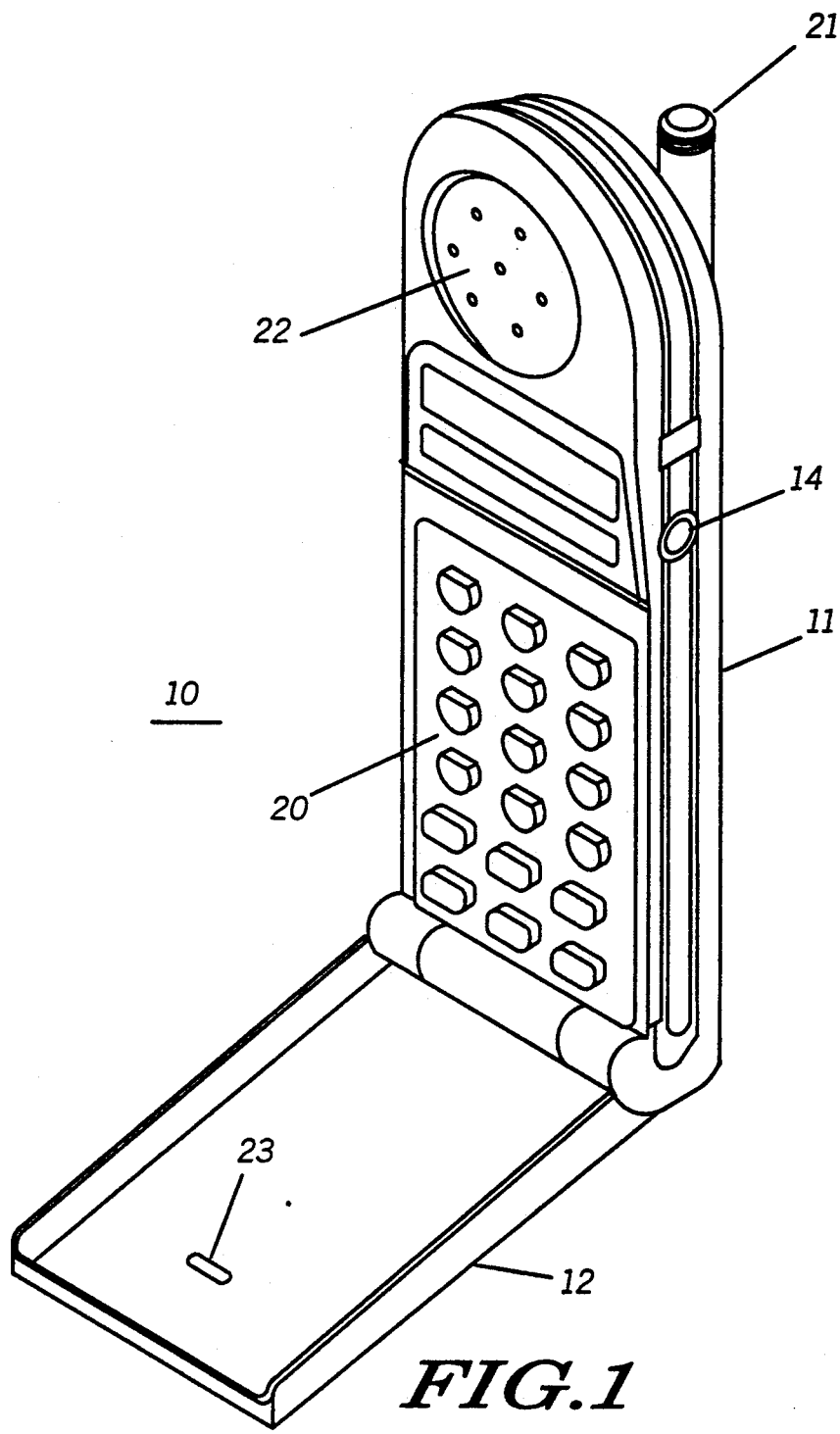
FIG. 1 is a perspective view of a communication device in accordance with the present invention shown in the handset position.
Figure 3:
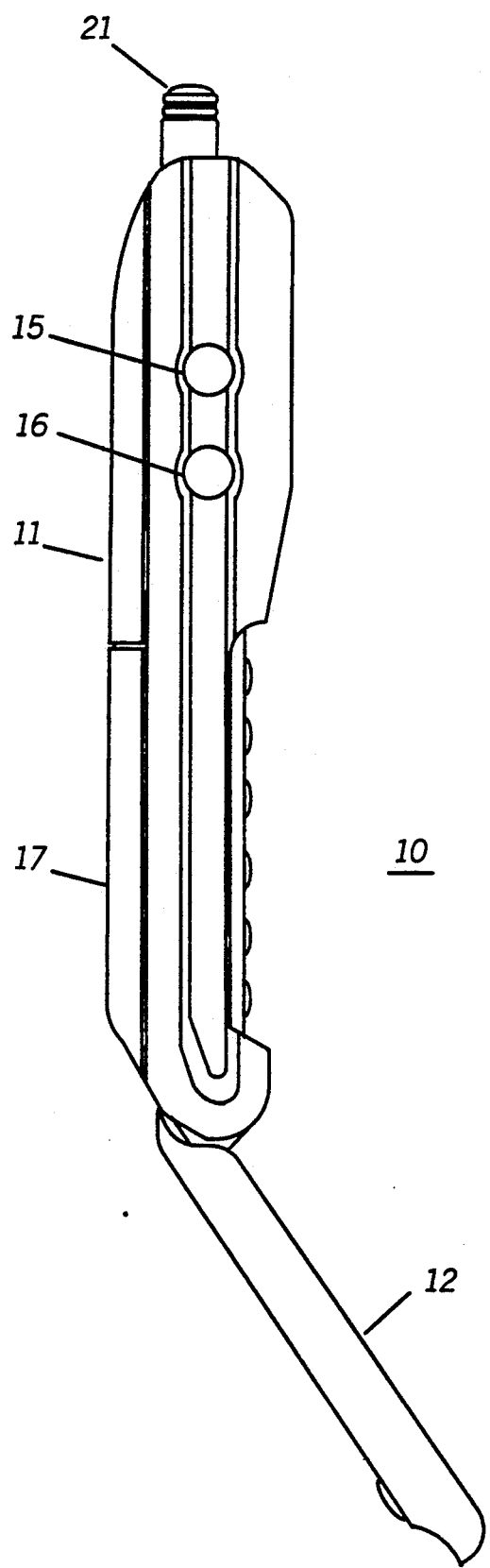
FIG. 3 is a side elevational view of the communication device shown in the handset position.

Referring now by characters of reference to the drawings and first to FIG. 1, a communication device, such as a two-way radio 10, includes a first housing portion 11 and a second housing portion 12. In this preferred embodiment, the housing portion 11 carries the radio circuitry and includes a push-to-talk switch 14, volume up-and-down controls 15 and 16 (shown in FIG. 3), respectively, and carries a battery portion 17.

The radio 10 preferably further includes a keypad 20 and can include an antenna 21 which can be either internal or external to the housing portion 11. A speaker port or grill 22 is also located in the housing portion 11.

The second housing portion 12 is pivotally or hingedly connected to the housing portion 11. It includes a first or inside microphone port 23 disposed on at one of its surfaces and an outside or second microphone port 24 disposed on another of its surfaces.

Figure 4:
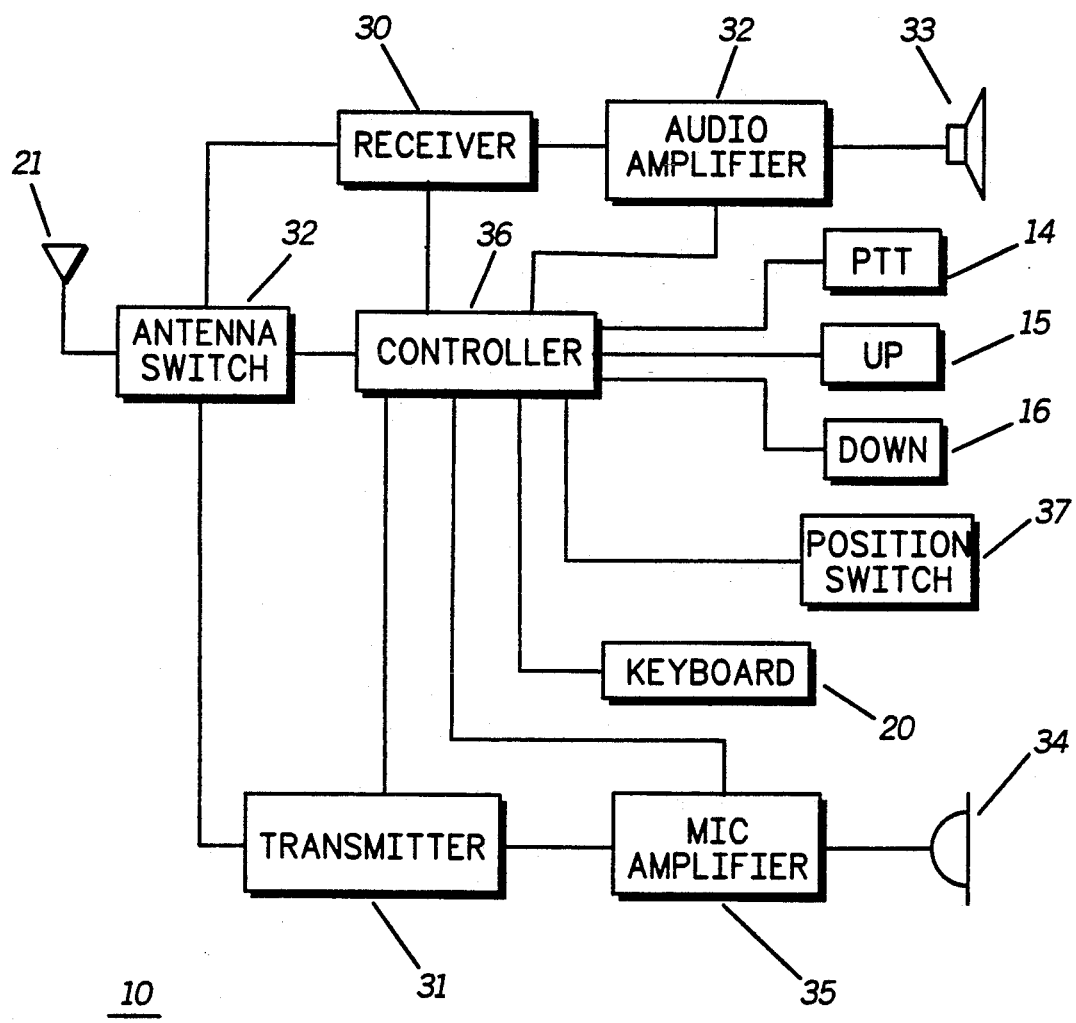
FIG. 4 is an electrical block diagram of the communication device.

The basic electrical block diagram of the radio 10 is illustrated in FIG. 4. As shown, the antenna 21 is coupled to receiver and transmitter portions 30 and 31, respectively, as by an antenna switch 32. Antenna switch 32 can be an electrical switching arrangement, such as those utilizing pin diodes, or can provide the antenna connection function by serving as a circulator or duplexer where frequency division duplex radio transmissions are to occur. Received audio signals are supplied by receiver 30 to an audio amplifier 32 comprising an amplifier means for driving an audio transducer, such as speaker 33. Voice signals to be transmitted by the radio 10 are applied to a microphone means, such as microphone 34, from which the audio signals are amplified by a microphone amplifier 35 prior to application to the transmitter 31. A control means which can be a microprocessor, such as controller 36, is used to control the operation of the radio 10. The push-to-talk switch 14 and up-and-down switches 15 and 16 are operatively coupled to the controller 36 as is the keyboard 20. A position switch 37 comprising sensor means, which is internal to the radio 10, is used for determining the relative position of the housing portions 11 and 12. This position switch is coupled to the controller 36 in order to provide automatic control features in the radio 10 relating to the positions of the housing portions 11 and 12.

The gain of audio amplifier 32 and microphone amplifier 35 are both controlled by the controller 36. And, preferably, are setable by using the up-and-down controls 15 and 16. Where the controller 36 includes internal memory, setting values can be stored within the controller 36. Preferably, the controller 36 stores values for both the open and the closed radio positions. For example, when the radio 10 is the open position, as illustrated in FIG. 1, the gain of audio amplifier 32 and consequently, the volume present at the speaker port 22 is set using the up-and-down button 15 and 16. When the radio 10 is in the closed position illustrated in FIG. 2, the gain of audio amplifier 32 is set independently of the gain of the audio amplifier when the radio 10 is in the open position. The controller 36 retains the last setting for the audio amplifier 32 for both positions of the radio 10. Similarly, the gain of the microphone amplifier 35 is also controlled dependent upon whether or not the radio 10 is open or closed. The position switch 37 indicates to the controller 36 the configuration of the radio 10. The controller 36 sets the gain of the amplifiers 32 and 35 accordingly.

When the radio 10 is the open or handset configuration of FIG. 1, typically the speaker port 22 would be in relative close proximity to the user's ear the microphone port 23 is in relatively close proximity to the user's mouth. In such use, the gain of audio amplifier 32 and radiophone amplifier 35 would most likely be set to relatively low values. Alteratively, when the radio 10 is in the closed or speaker-microphone configuration of FIG. 2, it is quite likely that the speaker port 22 would be some distance from the user's ear. Consequently, the gain of audio amplifier 32 would be set to a relatively higher value in order to provide increased audio output from the speaker 33. If the radio 10 is to be positioned some distance from the user's mouth, the gain of the microphone amplifier 35 would likewise be set to a relatively higher value.

Figure 2:
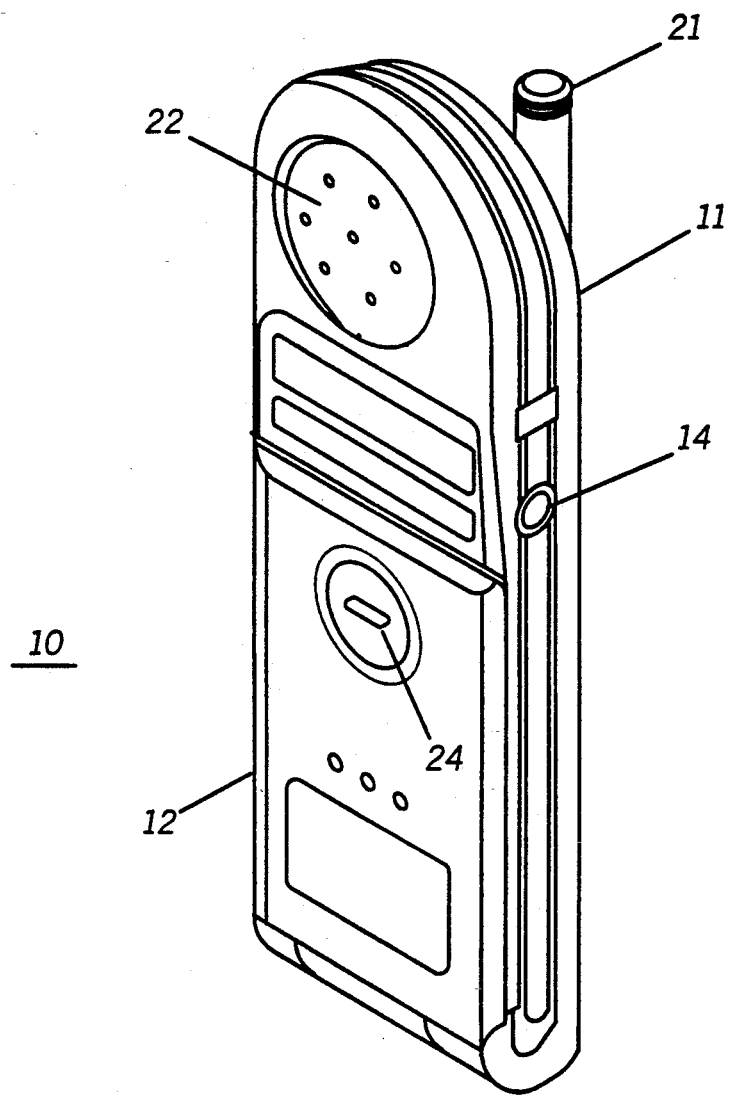
FIG. 2 is a perspective view of the communication device shown in the speaker-microphone position.

Typically, radio 10 would be used in the FIG. 2 speaker-microphone configuration when operating in a "dispatch" mode as is typical in a half duplex radio communication system. However, when the user desires privacy in communication or when duplex communication is to occur, the radio portion 12 would be rotated to its handset configuration, the position switch 37 would sense the relative positions of the housing portions and trigger the controller 36 to adjust the gain of audio amplifier 32 and/or audio microphone amplifier 35. Consequently, not only is the radio 10 usable in the two different configurations, but preferably the gain of the amplifiers 32 and 35 are automatically controlled based upon the configuration.

While the preferred embodiment of the communication device is the radio 10, it will be understood that the communication device could be a speaker and microphone unit which would typically be connected, as by a cable, to a radio. Additionally, the radio 10 utilizes a single microphone 34 which communicates with both microphone ports 23 and 24. If desired, separate microphone elements could be provided, with the position switch 37 operatively selecting the microphone based upon the current configuration of the radio.

As such, the radio 10 is extremely flexible, permitting use in both handset and speaker-microphone configurations. Preferably, the audio level of the speaker 33 and the microphone 34 are controlled accordingly.

What is claimed is:

1. A communication device for selectable use in a speaker-microphone half duplex communication configuration or a handset full duplex communication configuration, comprising:
    a housing having first and second portions,
    a speaker disposed in one of said portions;
    a microphone disposed in the other of said portions; and
    said housing portions being selectively configurable in first and second relative positions, one of said positions providing the handset configuration and the other of said positions providing the speaker-microphone configuration.

2. A communication device of as defined in claim 1, in which:
    said housing first and second portions are hingedly interconnected for relative rotation between said first and second relative positions.

3. A communication device as defined in claim 1, further comprising:
    sensor means for determining whether said housing portions are in said first or said second relative positions.

4. A communication device as defined in claim 3, in which: said sensor means comprises a switch.

5. A communication device as defined in claim 3, further comprising:
    amplifier means for providing an audio signal to said speaker, and
    control means for controlling said amplifier means; and
    said control means being responsive to said sensor means.

6. A communication device, as defined in claim 1, wherein said other housing portion, includes first and second surfaces, each of said surfaces includes a microphone port communication with said microphone.

7. A communication device for selectable use in half duplex communication position or full duplex communication position, comprising:
    a speaker;
    a microphone movable between the half duplex communication position and the full duplex communication position relative to the speaker;
    an amplifier having a controllable gain;
    a sensor for detecting whether said microphone is in said half duplex communication position or said full duplex communication position; and
    control means responsive to said sensor for controlling the gain of said amplifier.

8. A communication device, as defined in claim 7, in which the amplifier is operatively connected to said speaker.

9. A communication device, as defined in claim 7, in which said amplifier is operatively coupled to said microphone.

10. A communication device, as defined in claim 7, wherein the communication device comprises a radio.

11. A communicatoin device, as defined in claim 7, wherein the communication device comprises a speaker and microphone unit.

12. A radio for selectable use in a speaker-microphone half duplex communication configuration or a handset full duplex communication configuration, comprising:

a housing having first and second rotatively connected portions;

a speaker dispsoed in said first portion; and a microphone in said second portion;

said housing second portion including two surfaces, each of the surfaces including a microphone port communicating with said microphone; and said housing portions being selectively rotatably between said and second relative positions, one of said positions providing the handset configuration and the other of said positions providing the speaker-microphone configuration.

* * * * *

UNITED STATES PATENT AND TRADEMARK OFFICE
CERTIFICATE OF CORRECTION

PATENT NO.   :   5,276,916
DATED        :   January 4, 1994
INVENTOR(S)  :   Pawlish et al.

It is certified that error appears in the above-identified patent and that said Letters Patent is hereby corrected as shown below:

Column 4, line 40, delete "communication" and insert therefor -- communicating --.

Column 6, line 4, delete "said" and insert therefor -- first --.

Signed and Sealed this

Twenty-first Day of June, 1994

Attest:

BRUCE LEHMAN

Attesting Officer        Commissioner of Patents and Trademarks